United States Patent [19]

Gallup et al.

[11] Patent Number: 5,073,270

[45] Date of Patent: Dec. 17, 1991

[54] USE OF REDUCING AGENTS TO CONTROL SCALE DEPOSITION FROM HIGH TEMPERATURE BRINE

[75] Inventors: Darrell L. Gallup, Chino Hills; John W. Jost, Santa Ana, both of Calif.

[73] Assignee: Union Oil Company of California, Los Angeles, Calif.

[21] Appl. No.: 322,681

[22] Filed: Mar. 13, 1989

Related U.S. Application Data

[63] Continuation of Ser. No. 919,232, Oct. 15, 1986, Pat. No. 4,830,766, which is a continuation-in-part of Ser. No. 590,016, Mar. 15, 1984, abandoned.

[51] Int. Cl.$^5$ .............................................. C02F 5/08
[52] U.S. Cl. ..................... 210/698; 210/757; 210/696; 252/8.551; 252/8.552; 166/300; 166/310; 422/12; 60/641.2; 60/641.5
[58] Field of Search ............ 210/757, 696, 698; 252/8.552, 8.551; 166/310, 300; 60/641.2, 641.5; 422/12

[56] References Cited

U.S. PATENT DOCUMENTS

| 3,639,278 | 2/1972 | Hwa ................................ 252/180 X |
| 3,639,279 | 2/1972 | Gardner et al. ................ 252/8.55 B |
| 3,769,208 | 10/1973 | Cook et al. ............................ 210/696 |
| 4,500,434 | 2/1985 | Jost et al. ............................ 210/696 |
| 4,517,097 | 5/1985 | Merrill, Jr. ............................ 210/696 |
| 4,537,684 | 8/1985 | Gallup et al. ........................ 210/696 |

FOREIGN PATENT DOCUMENTS 0590986  1/1960  Canada .............................. 210/696

*Primary Examiner*—Fred Teskin
*Attorney, Agent, or Firm*—William O. Jacobson; Gregory F. Wirzbicki

[57] ABSTRACT

The deposition of metal-containing scale, such as iron silicate scale, from a hot aqueous geothermal brine, or the like, is controlled by blending into the brine sufficient reducing agent effective for reducing trivalent iron and manganese cations in a high temperature brine solution to divalent ions to cause an overall decrease in scale deposition, especially of iron silicate scale. Preferably, from 2 to 7 times the stoichiometric amount of reducing agent is used to effect a 70 to 90 percent reduction in the formation of iron silicate scale.

81 Claims, 1 Drawing Sheet

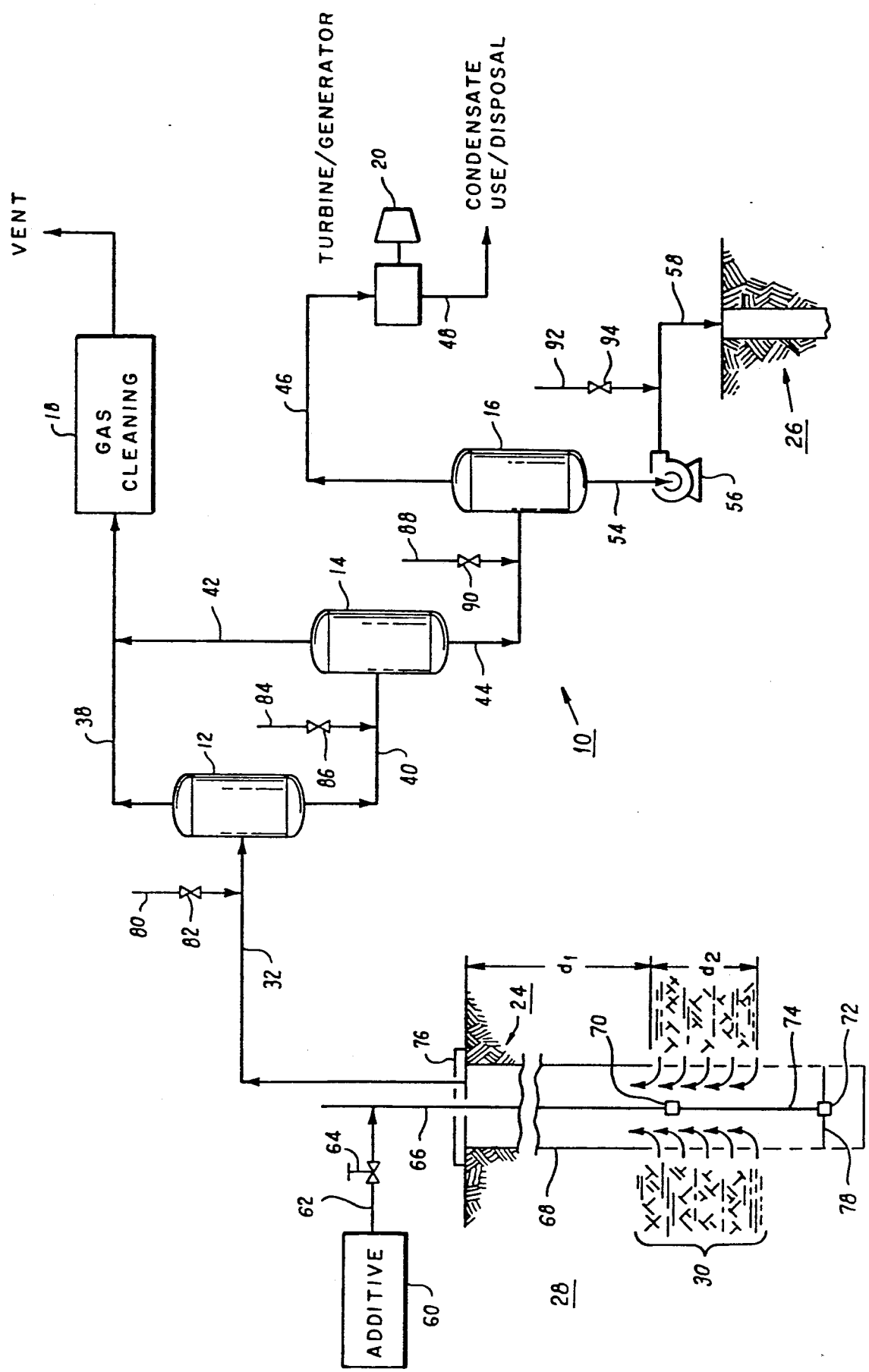

USE OF REDUCING AGENTS TO CONTROL SCALE DEPOSITION FROM HIGH TEMPERATURE BRINE

CLAIM OF PRIORITY

This application Ser. No. is a continuation of application Ser. No. 06/919,232, filed on Oct. 15, 1986, now U.S. Pat. No. 4,830,766, which in turn is a continuation-in-part of application Ser. No. 06/590,016, filed on Mar. 15, 1984, now abandoned.

BACKGROUND OF THE INVENTION

This invention relates to the treatment of a hot aqueous brine solution containing various dissolved components, such as iron and silica, to inhibit precipitation therefrom of undesirable scale, such as iron silicate scale. More particularly, the invention relates to such a treatment wherein the scale is formed when the brine is produced and handled in a manner so that its temperature and pressure are reduced, as when a geothermal brine is processed to recover its heat content.

The solubility of most ions in solution decreases with a decrease in temperature or pressure of the solution. If dissolved ions are present near their saturation concentration in the solution, a slight reduction in the temperature or pressure of the system can result in precipitation of a portion of these ions, which often combine and deposit as a scale on any solid surface with which they come into contact, such as the vessel or conduit in which the solution is confined.

One example of such a solution is a liquid stream containing hot water which is passed through a conduit in an industrial operation under conditions, such as a lowering of the pressure, which flash at least a portion of the hot water to steam. If the hot water is a brine containing appreciable amounts of dissolved salts, this flashing is often accompanied by the formation of scale on the surfaces of the conduit contacted by the fluid stream. Scale deposits tend to build up over a period of time and restrict further fluid flow through the conduit, requiring either operation at a reduced flow rate or an increase in the amount of power used to move the fluid through the conduit. In extreme cases, the conduit can become completely plugged with scale and the industrial operation must be shut down for maintenance.

Industrial operations for generating steam power often are hampered by the buildup of scale deposits caused by flashing of hot water containing dissolved salts. Among the various methods used to produce power from steam are fossil-fuel steam generators, nuclear steam supply systems, and geothermal generator units.

Geothermal steam and hot brines are found in naturally occurring, large subterranean reservoirs in many regions of the world. If located at readily accessible sites, geothermal steam and water or brine have, for some time, been used for therapeutic purposes, for industrial processes, or for direct heating. Although interest in developing geothermal resources further for these purposes still exists, recently the principal effort has been towards developing these partially renewable resources for production of electric power.

Techniques are known whereby hot geothermal fluids can be used to generate electric power. Pressurized geothermal water or brine, having a temperature above about 400° F., can be flashed to a lower pressure and the steam generated by flashing can be used to drive a steam turbine in combination with an electric generator. However, formidable problems are generally encountered in handling and disposing of large amounts of heavily contaminated and frequently highly saline geothermal liquids. Consequently, production of electricity from geothermal waters on a commercial scale has been difficult and costly to achieve.

One of the most serious problems encountered in using hot geothermal liquids for producing electric power results from scaling of the equipment used to confine and contain the liquid. Because geothermal liquids have usually been confined in subterranean reservoirs for extraordinarily long periods of time at elevated temperatures, large amounts of minerals are leached from the reservoirs into the brine. Typically, salts and oxides of heavy metals, such as lead, zinc, iron, silver, cadmium, and molybdenum, are found in geothermal brine. Other more common minerals, such as calcium and sodium, are also dissolved in the brine, as are naturally occurring gases, including carbon dioxide, hydrogen sulfide, and methane. An especially troublesome component of the hot brine may be silica, which is found in large concentrations in the form of silica acid oligomers.

Various proposals have been made to decrease the scale formation in equipment used in producing and handling geothermal brine. In "Field Evaluation of Scale Control Methods: Acidification," by J. Z. Grens et al., Lawrence Livermore Laboratory, Geothermal Resources Council, Transactions, Vol. 1, May 1977, there is described an investigation of the scaling of turbine components wherein a geothermal brine at a pressure of 220 to 320 p.s.i.g. and a temperature of 200° to 230° C. (392° to 446° F.) was expanded through nozzles and impinged against static wearblades to a pressure of 1 atmosphere and a temperature of 102° C. (215° F.). In the nozzles, the primary scale was heavy metal sulfides, such as lead sulfide, copper-iron sulfide, zinc sulfide, and cuprous sulfide. Thin basal layers of fine-grained, iron-rich amorphous silica promote adherence of the primary scale to the metal substrate. By contrast, the scale formed on the wearblades comprised cuprous sulfide, native silver and lead sulfide in an iron-rich amorphous silica matrix. When the brine which originally had a pH of 5.4 to 5.8 was acidified with sufficient hydrochloric acid to reduce the pH of the expanded brine to values between 1.5 to 5.0, scaling was eliminated. However, acidification of hot brines to such low pH levels may promote corrosion of the brine-handling equipment to such levels that corrosion defeats the use of acid for scale control.

While the aforementioned treatments have met with some success in particular applications, the need exists for a further improved treating process to reduce scale deposition during the handling of hot aqueous brines, especially geothermal brines.

Accordingly, the present invention provides a method for inhibiting the buildup of scale, especially iron silicate scales, on surfaces of the fluid-handling equipment contacted by hot geothermal fluids. The invention is particularly advantageous for treating a naturally acidic geothermal fluid, containing at least a portion of a geothermal brine, utilized for the generation of electric power so as to inhibit the deposition of metal silicate scale from the geothermal brine onto the fluid-handling equipment.

SUMMARY OF THE INVENTION

The present invention provides a method for treating an aqueous geothermal fluid at or below a pH of about 7 containing iron and silica scale-forming constituents, said method comprising adding to said fluid sufficient reducing agent to substantially reduce formation of iron and silica scale.

In one embodiment of the invention, there is provided a method for treating a stream of pressurized, naturally acidic, geothermal brine containing trivalent metal cations, especially those of iron and manganese, together with scale-forming silica species, which stream is passed through one or more vessels or conduits in which the pressure is reduced so that at least a portion of the water in the stream is flashed to produce steam. Between two and seven times the stoichiometric amount of a reducing agent effective at the pH of the brine for reducing the trivalent iron and manganese cations contained in the brine to divalent cations is added to the liquid stream so that the formation of scale in the vessel or conduits, especially iron silicate scale, is decreased by 70 to 90 percent, and any formed scale is washed away while the pH of the brine is changed by less than 0.1 pH unit.

BRIEF DESCRIPTION OF THE DRAWING

The present invention will be more readily understood by reference to the drawing which depicts in simplified form relevant portions of an exemplary geothermal brine production well and power plant with which the method for scale control of the present invention may be used to advantage.

DETAILED DESCRIPTION OF THE INVENTION

In producing and utilizing hot pressurized brine solutions which contain dissolved metal salts at or near their saturation concentration, when the pressure and/or temperature of the solutions are reduced, a portion of the metal salts can precipitate and deposit as scale on the surfaces of the vessel or conduit confining the brine. Examples of such hot pressurized brine solutions include geothermal brines and other brines used in a wide variety of industrial operations. A number of different types of scale can form depending on the nature and concentration of the metal salts in solution. Many of these scales are soluble in an acid solution. However, the addition of acid into the system usually results in severe corrosion of the ferrous metals normally used in the manufacture of the confining vessels and conduits because the brine is usually at high temperature, for example, between 250° and 500° F. While corrosion inhibitors are known for most acids, these inhibitors do not function well under the severe temperature conditions of many systems. Thus, the use of acid to dissolve such scale has been limited and most often is confined to systems employing corrosion-resistant but expensive metals rather than the ferrous metals found in most industrial equipment.

The concentration of ferric ions and silica species contributed by iron and silica-containing minerals dissolved from the reservoir by the hot brine is normally high, so that iron silicates are among the most pervasive and troublesome scales formed in the equipment used to handle and process geothermal brines. Corrosion of ferrous metals by addition of acid to the system further increases the concentration of ferric ions potentially available to form precipitates of iron silicates.

It has now been found that scale formation from neutral or acidic brine can be substantially reduced, for example, by up to about 90 percent, and scale previously formed can be removed without addition of corrosive acids by adding to the brine a sufficient quantity of a reducing agent which is effective for reducing trivalent iron and manganese cations at the pH of the brine without modifying the pH of the brine by greater than 0.1 pH unit. Usually, the reducing agent is added in an amount much greater than that stoichiometrically required to reduce the trivalent iron and manganese cations contained in the fluid stream to divalent cations, and usually in an amount between two and seven times, and preferably between three and five times, that stoichiometrically required to reduce the trivalent iron and manganese cations. Rather than contributing to corrosion as acid additives do, the reducing agent minimizes corrosion so that scale prevention and removal can be accomplished without damage to the fluid-handling equipment.

Shown in simplified form in the drawing are relevant portions of an exemplary geothermal brine power plant 10. Comprising generally power plant 10 are first wellhead separator 12, second wellhead separator 14, and flash vessel 16. Shown included in power plant 10 are gas-cleaning means 18 and steam turbine/generator 20. Associated with power plant 10, but not actually forming a part thereof, are brine extraction well 28 and brine reinjection well 26. Extraction well 28 penetrates into earth 24 a depth "$d_1$" to brine-producing formation 30 which has a thickness of "$d_2$." Ordinarily, reinjection well 26 is similar to extraction well 28, and may penetrate to the same producing formation 30.

In operation, hot geothermal brine is introduced under pressure from extraction well 28 through conduit 32 into the side region of first separator 12. Within separator 12, noncondensible gases, including hydrogen sulfide, carbon dioxide, and ammonia, are stripped from the geothermal brine. These noncondensible gases are discharged from the top of separator 12 through gas conduit 38 into gas-cleaning means 18. The brine is discharged from the bottom of separator 12 and is directed through conduit 40 into the side region of second separator 14, in which remaining amounts of noncondensible gases are stripped from the brine. These remaining gases are discharged from the top of separator 14 through gas conduit 42 into conduit 38, to be directed thereby into gas-cleaning means 18. Included in gas-cleaning means 18 may be heat exchangers (not shown) which enable heat to be extracted from the hot noncondensible gases to create additional steam from steam condensate in a manner known to those skilled in the art.

From separator 14, the brine is discharged through conduit 44 into flashing vessel 16. A pressure-reducing device, such as a level control valve (not shown), located on conduit 44 reduces the temperature of the brine from an initial temperature of about 425° to 450° F. to about 375° F. and reduces the pressure from an initial pressure of about 450 p.s.i.g. to the lower pressure of about 150 p.s.i.g. so that the brine is flashed within flashing vessel 16 to release steam, the released steam being routed from vessel 16 through conduit 46 to steam turbine/generator 20. Condensate and/or steam are discharged from turbine/generator 20 through conduit 48 for disposal or for routing to heat exchanger portions of gas-cleaning means 18. Flashed brine is discharged from flashing vessel 16 through conduit 54 to pump 56, which pumps the brine through conduit 58 into reinjection well 26. Alternatively, pump 56 may pump the brine to other means of disposal or to other uses (not shown).

Effective pH of the brine as it enters well 28 from producting formation 30 is believed typically to be between about 4 and 4.5; however, due to removal of the noncondensible gases, the pH of the brine typically increases to between about 4.5 and 6 by the time it enters flashing vessel 16. Ordinarily, as the brine enters well 28 from formation 30, flashing occurs to an extent causing release of about 1 to 1.5 percent of the steam contained in the brine, and by the time the brine reaches the top of well 28, additional flashing usually has occurred to an extent that between about 10 and 20 percent of the steam has been released. Brine temperature at producing formation 30 varies considerably from well to well, but is usually in the broad range of from about 350° to 600° F., with a brine temperature of between about 450° to 500° F. being typical of many localities.

Any convenient means of introducing the reducing agent to the brine can be used. Usually, however, the reducing agent is introduced from source 60, through conduit 62 containing valve 64 into conduit 66 which extends down well 28, inside of well casing 68, terminating in nozzle 70 positioned approximately opposite brine-producing formation 30. In a preferred embodiment, the downhole apparatus employed in the method of this invention includes anchor 72 attached to nozzle 70 by connecting rod or conduit 74. Anchor 72 helps maintain the position of nozzle 70 in well 28 during the injection of the reducing agent down conduit 66. Conduit 66 can be a small diameter coiled tubing extending several thousand feet down well 28 from wellhead 76, which in the absence of anchor 72, may permit nozzle 70 to move about undesirably in well 28. Anchor 72 helps maintain nozzle 70 adjacent to brine-producing formation 30, the location where it is desired to inject the reducing agent into the flow of geothermal brine. For convenience, anchor 72 may be positioned anywhere in the vicinity of nozzle 70. Since brine-producing formation 30 is sometimes incompetent, it is preferred to position anchor 72 in well 28 below producing formation 30 as shown in the drawing. Anchor 72 can be of any conventional design, for example, an anchor having three or more locating arms 78 which fold up independently as collars while anchor 72 is being lowered downhole. To set locking arms 78 against the formation when the desired depth is reached, conduit 66 is retracted a short distance so that the locking arms unfold. Later, when it is desired to remove nozzle 70 from the well, a stronger upward pull on conduit 66 shears a pin (not shown) in anchor 72, allowing locking arms 78 to collapse and the apparatus to be pulled from well 28. Since the reducing agent exits conduit 66 via nozzle 70, connecting rod or conduit 74 does not transport any fluid. The purpose of conduit 74 is merely to attach nozzle 70 firmly to anchor 72. Conduit is used in this embodiment to attach the anchor to the nozzle simply because conduit material is readily available and provides mechanical strength.

Since the portion of conduit 66 extending below wellhead 74 is exposed to the high temperature environment of the geothermal fluid being produced, it is preferred that conduit 66 and nozzle 70 be made of a corrosion-resistant metal, e.g., stainless steel, Hastelloy, Inconel, or the like.

The reducing agent can be injected from source 60 downhole to producing formation 30 so as to reduce the trivalent metal ions to divalent ions as close as is practical to the origin of the brine, but the reducing agent may be injected at any of the following locations: (1) into brine conduit 32 between wellhead 76 and first separator 12 via conduit 80 containing valve 82; (2) into brine conduit 40 between first and second separators 12 and 14 via conduit 84 containing valve 86; (3) into brine conduit 44 between second separator 14 and flash vessel 16 via conduit 88 containing valve 90; and/or (4) into conduit 58 just upstream of injection well 26 via conduit 92 containing valve 94. Conduits 80, 84, 88, and 92 each are connected to reducing agent source 60 (connections not shown).

When finely divided particles of carbon black, elemental iron, or zinc dust are used as the reducing agent in geothermal brines, difficulty may be encountered in mixing the finely divided particles into the brine stream without forming agglomerated lumps of insoluble particles that will clog pumps and reduce the efficiency of the scale-reducing treatment by decreasing contact between the reducing agent and the brine. To overcome this difficulty, it is preferred to introduce the finely divided particles into the brine as a suspension in a water-soluble medium compatible with the geothermal reservoir by mixing the finely divided particles into a compatible water-soluble medium sufficiently thickened to hold the fine particles as a suspension, such as an aqueous solution of cornstarch, animal glue, technical gelatin, polyacrylamide polymer and the like. The suspension can also be in a nonaqueous viscous medium such as mineral oil, and the like. Most preferably, the finely divided particles are suspended in animal glue. Usually, an aqueous solution of about 5 to 20 percent, preferably 15 to 20 percent, by weight of the thickening medium is useful for suspending the metal particles. Once suspended in the thickened medium, the finely divided particles can be introduced into the brine stream at any of the above-mentioned points in any convenient manner.

The reducing agent is usually added to brine having a pH between about 4 and 7. Scale-forming trivalent metal cations usually precipitate as hydroxides from hot, aqueous brines having a pH above about 7, making addition of reducing agent to control silicate scales ineffective and wasteful at pH levels above that point.

However, at pH values below about 5 encountered in naturally acidic geothermal brines, certain reducing agents become ineffective or less effective for preventing formation of iron silicate scales, while others remain unimpaired in effectiveness. The reducing agents which remain effective at pH values below about 5 are readily determined, for example, by the method described hereinafter in Examples 13 to 48. While the treatment using a reducing agent of this invention is effective in controlling a wide variety of scale, of particular importance are metal silicate scales, especially iron silicate scales. Such scales are believed formed by the reaction of hydrated ferric oxyhydroxide with silica acid or silica acid oligomers as follows:

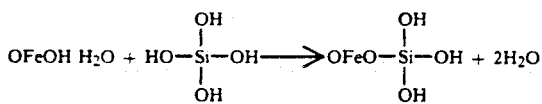

The indicated reaction of ferric oxyhydroxide with silicic acid forms insoluble iron-rich silicates. The addition of reducing agents capable of reducing trivalent iron and manganese cations is believed to inhibit the formation of the precipitate by forming brine-soluble divalent iron and manganese ions that do not react with silica to create a precipitate. However, regardless of the specific nature of the reaction involved and the specific effects upon the reaction of the reducing agent, it has nevertheless been demonstrated that the method of this invention is effective in reducing the scales deposited from geothermal brine with minimal corrosion of the metal vessels and conduits.

The broadest category of brine-soluble reducing agents suitable for use in this invention are those capable of reducing scale-forming trivalent transition metal cations to divalent cations in a brine having a pH of about 7 or below, especially cations of the metals which form silicate scales, such as iron and manganese. Within this broad category a large group of organic and inorganic reducing agents are effective at a pH of about 5 or above, while those reducing agents which remain effective at pH below about 5 form a smaller group and are useful at all pH values below 7.

Exemplary organic reducing agents effective at a pH between about 5 and 7 include carbon monoxide, sodium formate, formaldehyde, starch, dextrose, sucrose, corn syrup, glyoxal, acetaldehyde, butyraldehyde, methanol, ethylene glycol, t-butanol, phenol, hydroquinone, potassium cyanide, carbon disulfide, thioglycolic acid, ammonium thioglycolate, urea, urea hydrochloride, formamide, formamide hydrochloride, ammonium thiocarbonate, thiou-rea, ascorbic acid, formic acid, oxalic acid, sodium formaldehyde sulfoxylate, sodium formaldehyde bisulfite, animal glue and glycine. Among the inorganic compounds useful as reducing agents at a pH between about 5 an 7 are potassium iodide, sulfur, ammonium thioglycolate, sodium dithionite, stannous chloride, iron wire, aluminum, hydrazine hydrochloride, sulfur dichloride, arsenious acid, hydrogen, sodium sulfite, sodium bisulfite, sulfur monochloride, sodium and ammonium thiosulfates, and finely divided particles of elemental iron, elemental zinc and carbon black, with the most preferred reducing agent being sodium formaldehyde sulfoxylate.

It is well known that sucrose and starch are cleaved at high temperature or in acid to yield dextrose. Hence, in high temperature geothermal brines, having a pH in the range from 5 to 7, sucrose and starch decompose to form dextrose, thereby making them useful as reducing agents or reducing agent precursors in this pH range.

Many of the above-listed reducing agents lose effectiveness at pH values below about 5. Those which retain effectiveness at low pH and are therefore especially useful for brines having a pH below about 5 are sodium thiosulfate, sodium dithionite, sodium formaldehyde sulfoxylate, sodium formaldehyde bisulfite, thioglycolic acid, ammonium thioglycolate, stannous chloride, iron wire, aluminum, animal glue, glycine, and finely divided particles of carbon black, elemental iron, and elemental zinc, with the preferred reducing agent at pH values below pH 5.0 being sodium formaldehyde sulfoxylate.

It can readily be seen from the foregoing that in all pH ranges, when the reducing agent is a salt, the anion is the species useful as a reducing agent. For this reason, other alkali metal salts may readily be substituted for the named sodium or ammonium salts listed above. For example, potassium dithionite or potassium formaldehyde sulfoxylate can be substituted for sodium dithionite or sodium formaldehyde sulfoxylate. Likewise, corresponding ammonium salts may be substituted for the sodium salts listed above.

In the present invention, it is highly preferred that the reducing agent be added under conditions such that the pH of the brine stream into which it is injected is altered by less than about 0.1 pH units. Thus, in the present invention, the reducing agent is most preferably added to the brine stream without further treatment thereof with a pH modifier, such as an acid or base. Without the addition of an acid or base or other pH modifier, it will generally be found that the reducing agents hereinbefore disclosed will prove useful for reducing scaling without the necessity of adding more reducing agent than would affect the pH by less than about 0.1 pH unit.

The concentrations of dissolved metals in geothermal brines vary from location to location so that the metal cations capable of precipitating as silicates at any given geothermal site may include silicate-forming cations in addition to the trivalent cations of iron and manganese, such as perhaps those of vanadium and cobalt. However, in the vast majority of geothermal brines, the concentrations of silicate-forming cations in addition to those of iron and manganese are extremely small. For this reason, it would be expected that the reducing agent should generally be added in an amount slightly greater than that stoichiometrically required to reduce to divalent cations the trivalent iron and manganese cations contained in the brine, the excess being sufficient to also reduce any trace amounts of other silicate-forming cations that may be present in the brine. The concentrations of trivalent iron and manganese cations in geothermal brine may easily be determined by known means.

However, the behavior of reducing agents in geothermal brines and other brines of comparable ionic strength differs markedly from the behavior of the same reducing agents in weak brines such as potable waters. Geothermal brines typically contain at least 180,000 parts per million of total dissolved solids, usually in the range of from 180,000 to 281,000 parts per million by weight, whereas potable waters by Federal standards contain no more than about 1,000 parts per million of total dissolved solids. In addition, geothermal brines contain at least 150 parts per million by weight of total silicon species, as calculated as silicon, or 321 parts per million by weight, as calculated as silica, and at least 500 parts per million by weight iron, oftentimes at least 1,000 parts per million by weight, even above 2,000 parts per million by weight. It is believed that diffusion and mass transport in the reducing reaction as compared with those in potable water are greatly slowed by the sheer quantity of competing ions present in strong brine. However, regardless of the specific nature of the reaction involved and the specific effects upon the reaction of the high ionic content of the brine, it has been found that in strong brines having very high ionic concentrations, such as those in geothermal waters, the amount of reducing agent required to reduce a known quantity of specific ions, such as the trivalent ions of iron and manganese, is much greater than the stoichiometric amount of the reducing agent, usually greater than 2 times the stoichiometric amount.

Some reduction of scaling in geothermal waters can be achieved by adding an amount of reducing agent slightly greater than that stoichiometrically required to reduce the trivalent iron and manganese in the brine to divalent ions. However, to alleviate the operational problems that result from scaling in geothermal surface handling equipment, a reduction in the rate of scaling of between 70 and 90 percent is usually required. It has been found that in typical geothermal brines the reducing agent must be added in an amount between about two and seven times the stoichiometric amount needed to reduce the trivalent iron and manganese ions in the brine to divalent ions to achieve a reduction in the scaling rate of between about 70 and 90 percent. The ionic concentration of the brine must also be taken into account in determining the amount of reducing agent to be used in achieving a desired decrease in the rate of scaling. It has been found that the amount of reducing agent required to prevent or reduce production of scales in geothermal waters increases as the concentration of total dissolved solids in the brine increases. For example, the amount of scale reduction achieved by using about three times the stoichiometric amount of reducing agent for reducing the trivalent iron and manganese cations to divalent cations in a brine containing 180,000 ppmw of total dissolved solids is more than one and a half times the reduction that can be achieved in a brine containing 281,000 ppmw of total dissolved solids.

In general, however, a reduction in the scaling rate in geothermal brines of between about 70 and 90 percent can be obtained by using between about 2 and 7 times, and preferably between 3 and 5 times, the stoichiometric amount of reducing agent for reducing trivalent iron and manganese cations to divalent cations.

If the geothermal fluid contains (as many brines from Brawley, Calif. do) 5 to 50 ppmw of trivalent iron cations and less than 5 ppmw of trivalent manganese cations, the stoichiometric concentration of sodium formaldehyde sulfoxylate needed is 7.5 to 75 ppmw, so that sufficient sodium formaldehyde sulfoxylate needed to provide seven times the stoichiometric concentration is seven times these values, i.e., 52.5 to 525 ppmw. The required amounts of reducing agent can be injected directly into the flowing stream of brine as described hereinabove.

In an alternative embodiment, the reducing agent is added as finely divided particles suspended in a solution containing a thickening medium, such as animal glue or technical gelatin. It has been found that the addition of as little as about 2 times the stoichiometric amount of carbon black, elemental zinc, or elemental iron to a brine containing 180,000 ppmw of total dissolved solids is required to substantially reduce the trivalent iron and manganese cations in the brine to divalent cations. When the brine contains either a higher concentration of total dissolved solids or of trivalent iron and manganese, or both, a higher concentration of the divided particles will be required to obtain a substantial reduction in the concentration of scales, particularly of iron silicate scales. Usually, the finely divided particles range in size from 250 mesh to dust, preferably 375 mesh, and can be added to geothermal brine in a thickened aqueous solution to reduce the formation of metal-containing scales from geothermal brine. In an alternative embodiment of this invention, therefore, an aqueous solution comprising 2 to 100 ppm by weight of finely divided particles selected from the group consisting of carbon black, elemental iron, and elemental zinc, and between 15 and 20 percent, preferably between 5 and 20 percent, and most preferably 10 percent by weight of a thickening medium selected from the group consisting of animal glue, gelatin, cornstarch, and polyacrylamide polymer is added to the brine stream to prevent the formation of metal-containing silicate scales from geothermal brines.

The present invention is further described by the following examples, which are illustrative of various aspects of the invention but which are not intended as limiting the scope of the invention as defined by the appended claims.

EXAMPLE 1 to 4

A series of field tests are made to determine the effect of the addition of sodium formate to a high enthalpy, silica-rich, heavy metal laden, hypersaline brine of an extremely reactive nature. There is produced from a production well a geothermal fluid comprising a mixture of steam and brine. The geothermal fluid is passed through a first separator where the steam and brine are separated and the steam is used to drive a turbine. Sodium formate is injected into the flowing stream of brine, which has a pH of about 5.5, upstream of the first separator. The brine containing the reducing agent is next passed through a level control valve, which reduces the temperature and pressure of the brine. From there it is passed into a second separator where an additional quantity of steam is flashed, which is also vented to the atmosphere. The brine is then repressurized and reinjected back into the subterranean geothermal reservoir via an offset injection well. During the test, measurements are made of the extent and content of scale build-up in the unit, and of the extent of corrosion at various locations in the fluid-handling equipment.

These field tests and the results therefrom will now be described in more detail. A geothermal fluid comprised of about 90 percent by weight brine and about 10 percent by weight steam is produced from a production well at a temperature of 455° F. and a pressure of 400 p.s.i.g. The brine contains about 180,000 weight parts per million of various elements: 1.7 silver, 3 arsenic, 190 boron, 880 barium, 103 bromine, 1.2 cadmium, 17,000 calcium, 96,000 chlorine, 0.06 chromium, 12 cesium, 5.2 copper, 0.4 fluorine, 520 iron, 5 iodine, 13,500 potassium, 177 lithium, 110 magnesium, 500 manganese, 31,000 sodium, 55 lead, 43 rubidium, 200 silicon, 760 strontium, 302 zinc, less than 0.1 nickel, less than 1 selenium, and less than 0.3 aluminum.

The geothermal fluid is passed at a rate of about 250,000 pounds per hour through an 8-inch diameter carbon steel pipe to and through two 48-inch diameter, 26-feet-long horizontally positioned separators operated in series. The first separator is operated at 400 p.s.i.g. The separated steam is used to drive a turbine. Just downstream of the wellhead, an aqueous solution containing 60 ppm by weight of sodium formate is pumped at various rates from a storage facility into the brine via an injection nozzle.

The brine containing reducing agent is next fed through a level control valve to the second horizontally positioned separator, which is operated at 150 p.s.i.g. The additional separated steam is again sent to a turbine. The brine is next fed to a charging pump where the pressure of the brine is increased to about 160 p.s.i.g. The partially repressurized brine is then fed to an injection pump which pumps the brine at a high flow rate and at about 750 p.s.i.g. pressure approximately 5,000 feet to an offset injection well and back into the geothermal reservoir. Carbon steel corrosion coupons are positioned in the flowing brine at four locations, i.e., just before the reducing agent injection point, just after the reducing agent injection point, immediately downstream of the injection pump discharge, and near the injection wellhead.

Scale build-up on piping and vessels is measured by on-line radiographic techniques employing an Iridium-192 source. The source and film plate are positioned on opposite sides of the point of interest. The differences in gamma absorption of the brine, scale, and steel result in sufficient contrast to produce a radiograph from which projected thickness of scale can be measured.

The results of these tests are summarized in Table I. In Test 1, no reducing agent is employed, whereas in Tests 2, 3, and 4, 60 ppmw of sodium formate, which is about 2.8 times the stoichiometric amount required to reduce the trivalent iron and manganese cations contained in the brine to divalent ions, is injected into the brine upstream of a level control valve. The drop in temperature and pressure across the valve is sufficient to initiate scale deposition in the test systems. In Test 1, which employs no reducing agent, the build-up of iron silicate-containing scale downstream of the temperature and pressure reducing valve is rapid in the test apparatus. However, in Tests 2, 3, and 4, which employ reducing agent, the overall build-up of scale is either comparable to or less than that produced without the reducing agent, the reductions in overall scaling ranging up to as much as 55 percent by weight.

Moreover, in Tests 2, 3, and 4, the addition of reducing agent consistently decreases the build-up of iron silicate scale compared to Test 1 wherein no reducing agent was added to the brine. Particularly good results were obtained in Test 4 wherein the iron silicate deposition is reduced from that produced in Test 1 by 59.6 percent. Thus, an amount of sodium formate about 2.8 times that sufficient to reduce the trivalent iron and manganese ions contained in the brine to divalent ions is effective at the natural pH of the brine for reducing the formation of scale at high temperature from the particular brine treated in this experiment. In particular, iron silicate scale is reduced by between about 37 and 60 percent without addition of acid to the brine.

As shown in Tests 2, 3, and 4, the addition of reducing agent causes an increase in the percentage of silver in the scale formed, although there is an overall decrease in the iron silicate scale formed.

TABLE I

EFFECT UPON SCALE OF ADDING SODIUM FORMATE TO HOT GEOTHERMAL BRINE

| Test | Concentration of Sodium Formate (ppm)* | Total Deposit (ppm)* | Iron Silicate (ppm)* | % Reduction Iron Silicate | Silver in Scale ppbw/ ft²** | % Increase Silver |
|---|---|---|---|---|---|---|
| 1 | 0 | 15.1 | 9.4 | — | 0.88 | — |
| 2 | 60 | 12.0 | 4.7 | 50.0 | 2.17 | +146 |
| 3 | 60 | 15.3 | 5.9 | 37.2 | 2.14 | +144 |
| 4 | 60 | 6.8 | 3.8 | 59.6 | 1.05 | +15 |

*Values in weight parts per million weight parts of brine.
**Values in weight parts per billion weight parts of brine deposited per square foot of surface area

EXAMPLES 5 TO 12

Tests are conducted to compare the corrosive effect upon the brine-handling equipment of brine containing no reducing agent with a brine containing an added reducing agent. A series of parallel tests with and without 60 ppmw of sodium formate added to brine having a natural pH of about 5.5 are conducted to test the corrosivity of the treated brine to a series of common metal alloys, which are designated and defined according to the usage of the Metals Handbook published by the American Society for Metals. The test equipment and procedure are the same as those described in Tests 1 to 4 hereinabove except that in each set of parallel tests the corrosion coupons positioned throughout the test equipment as hereinabove described are chosen from a series of different metal alloys.

Except for the anomalous results of Test 6, the results summarized in Table II show that, for all of the alloys tested except AL 64 in Test 5, the addition of a reducing agent in an amount about twice that stoichiometrically required to reduce the trivalent iron and manganese cations in the brine to divalent cations results in a decrease in both the total amount of metal lost in general corrosion and in the rate at which pits grow.

The addition of the reducing agent to control the deposition of scale from geothermal brines in liquidhandling equipment, therefore, does not contribute to the corrosion of the equipment. Rather, for most of the common metal alloys tested, it actually reduces the corrosion that would result from untreated brine.

TABLE II

CORROSION TO COMMON METAL ALLOYS RESULTING FROM ADDITION TO GEOTHERMAL BRINE OF NO FORMATE AND FROM ADDITION OF SODIUM FORMATE

| | | No Formate | | 60 ppmw Formate | |
|---|---|---|---|---|---|
| Test No. | Alloy** | General Corrosion | Pitting Corrosion | General Corrosion | Pitting Corrosion |
| 5 | AL 64 | 0.1 | 0 | 0.14 | 0 |
| 6 | 1018 | 30 | 0 | 7 | 130*** |
| 7 | 1018 | 17 | 73 | 4 | 26 |
| 8 | P5 | 7 | 36 | 1.5 | 12 |
| 9 | P9 | 7 | 91 | 2.8 | 33 |
| 10 | P11 | 11 | 27 | 3.5 | 26 |
| 11 | A 515 | 10 | 36 | 7 | 26 |
| 12 | K55 | 16 | 36 | 9 | 19 |

*Weight parts per million weight parts of brine.
**Alloys are defined and designated according to the usage of the Metals Handbook published by the American Society for Metals.
***This value for pitting corrosion in Alloy 1018 is inconsistent with the results of the other experiments. It is believed to be the result of experimental error.

EXAMPLES 13 TO 48

To determine which reducing agents remain effective for reducing ferric cations in brines having a pH below about 4.5, a series of parallel tests are conducted in a pressurized autoclave upon a simulated geothermal brine of relatively high pH and a field brine of relatively low pH. The brines are analyzed for the concentration of iron ions before and after treatment with the reducing agent and subjection to elevated temperature and pressure.

More particularly, the effect of variations in pH upon the capacity of reducing agents to reduce ferric ions in geothermal brine is tested by adding twice the stoichiometric amount required to reduce to divalent cations the initial concentration of ferric ions contained in 250 milliliters of brine. Two kinds of brine having relatively high and relatively low pH are tested. Atmospheric storage pond brine from the Brawley Steam Gathering System ranging in concentration of ferric ion from 50 to 150 ppm by weight and having a pH of 4.5 or below due to the formation of ferric hydroxide is used to test the effectiveness of reducing agents in brines having a natural pH of 4.5 or below. A synthetic brine is prepared by dissolving sufficient ferric chloride to produce a brine containing about 15 ppm by weight of ferric ions into a 20 percent by weight aqueous solution of sodium chloride and adjusting the pH to between 5 and 5.5. This synthetic brine is used to test the effectiveness of reducing agents in brines having a pH in the higher pH range.

The mixture of brine and reducing agent is placed into a one-liter Hastelloy-C autoclave and stirred. The autoclave is purged with nitrogen to exclude oxygen and then is heated to about 450° F. until a head of about 400 p.s.i.g. of steam has developed. After heating and pressurization of the autoclave, a one-milliliter sample of brine is withdrawn therefrom through a sample port and analyzed colorimetrically to determine the initial concentration of ferric ion. After having been maintained at the above-described temperature and pressure for a period of one hour, a second one-milliliter sample of brine is withdrawn and analyzed to determine the residual concentration of ferric ion. This procedure is followed using the set of higher pH mixtures of synthetic brine pond samples plus reducing agent, except that for the latter set of samples the colorimetric examination is conducted visually by determining the degree to which the yellowish color characteristic of ferric ion in solution is turned colorless by the action of the reducing agent. The results are summarized in Table III.

TABLE III

THE EFFECT OF ACIDIFICATION UPON THE REDUCING CAPACITY OF REDUCING AGENTS IN HIGH TEMPERATURE BRINE

| Test No. | Reducing Agent | Percent Reduction at pH 5-5.5 | Reduction at pH 4.5 or below |
|---|---|---|---|
| 13 | Formic acid | 68 | slight |
| 14 | Sodium formate | 82 to 86 | slight |
| 15 | Formaldehyde | 75 | slight |
| 16 | Dextrose | 60 | slight |
| 17 | Sucrose | 70 | slight |
| 18 | Corn syrup | 82 | none |
| 19 | Glyoxal | 59 | none |
| 20 | Acetaldehyde | 33 | none |
| 21 | Butyraldehyde | 58 | none |
| 22 | Methanol | 30 | none |
| 23 | Ethylene Glycol | 39 | none |
| 24 | T-butanol | 63 | none |
| 25 | Phenol | 73 | none |
| 26 | Hydroquinone | 59 | none |
| 27 | Potassium cyanide | 66 | none |
| 28 | Potassium iodide | 60 | slight |
| 29 | Sulfur | 79 | none |
| 30 | Carbon disulfide | 84 | none |
| 31 | Sodium thiosulfate | 100 | total |
| 32 | Sodium dithionite | 100 | total |
| 33 | Thioglycolic acid | 96 | total |
| 34 | Ammonium thioglycolate | 99 | total |
| 35 | Stannous chloride | 96 | total |
| 36 | Iron wire | 90 | total |
| 37 | Aluminum | 64 | total |
| 38 | Hydrazine hydrochloride | 85 | none |
| 39 | Urea | 67 | none |
| 40 | Urea hydrochloride | 91 | none |
| 41 | Formamide | 84 | slight |
| 42 | Sulfur dichloride | 97 | slight |
| 43 | Ammonium thiocarbonate | 77 | slight |
| 44 | Thiourea | 84 | slight |
| 45 | Ascorbic acid | 50 | none |
| 46 | Arsenious acid | 10 | none |
| 47 | Hydrogen | 50 | slight |
| 48 | Carbon monoxide | 50 | slight |

From the results summarized in Table III, it can be seen that, while most of the reducing agents tested were effective at a pH about 5 or above, only a few remain effective at a pH below about 5 for reducing ferric ions to ferrous ions in hot, high-pressure brine solutions, such as geothermal brine. Of the reducing agents tested, only sodium thiosulfate, sodium dithionite, thioglycolic acid, ammonium thioglycolate, stannous chloride, iron wire, and aluminum, as shown in the results of Tests 31 through 37, remain effective reducing agents in highly acidic brines having a pH of 4.5 or below.

EXAMPLE 49

A well-scale field test is conducted at the V-1B Veysey #7 geothermal well located at Brawley, Calif., to test the effectiveness of a reducing agent additive for decreasing production of iron silicate scale in the field. Veysey #7 geothermal well contains between 25 and 30 ppmw of trivalent iron and less than 5 ppmw of trivalent manganese, and the concentration of total dissolved solids is about 180,000 ppmw. Sodium formate is injected into a geothermal brine stream having a natural pH of 5.2 to 5.3 in a concentration of 60 ppm by weight of total brine at a point several hundred feet upstream of the wellhead separator so that the residence time of the formate in the brine ahead of the sampling point from which brine samples are collected is about 5 minutes. A concentration of 60 ppm by weight of sodium formate is about 2.8 times that stoichiometrically required to reduce the trivalent iron and manganese in the brine to divalent cations. Injection of sodium formate continues over a 56-day span.

Liquid samples of flashed brine collected from the brine outlet of the first separator throughout the course of formate injection are analyzed by well-known methods to determine the concentration of ferric ion remaining after treatment with the reducing agent. A determination of the percent reduction of ferric ion in the flashed brine is made by comparing the concentration in each flashed sample with the concentration of ferric ions in a sample of untreated brine. A summary of the results appears in Table IV.

TABLE IV

DECREASE OF FERRIC ION IN TREATED BRINE DURING SCALE CONTROL FIELD TEST

| Day | Concentration of $Fe^{+3}$ (ppm)* | Percent Reduction In Concentration of $Fe^{+3}$ |
|---|---|---|
| 0 | 14 | — |
| 1 | 2.7 | 81 |
| 14 | 3.5 | 75 |
| 28 | 0.9 | 99 |
| 48 | 1.1 | 93 |

*Weight parts per million weight parts of brine.

These results show that addition of an amount of sodium formate approximately 2.8 times that required to reduce the ferric ions contained in untreated brine is effective for reducing up to 99 percent of the ferric ions contained in the hot pressurized brine removed from a geothermal reservoir.

sodium dithionite by 64 percent. The results for overall scale reduction are more difficult to evaluate due to data scatter; however, in more than half of the tests, scale reduction was achieved, with the reductions being as high as 80 percent.

TABLE V

RESULTS OF PILOT SCALE FIELD TESTS

| Test No. | Reducing Agent | % Brine Source (Veysey Well #) | Reduction in Scale Formed in Field Test | % Reduction iron Silicate | % Increase Silver |
|---|---|---|---|---|---|
| 50 | Hydrazine monohydrochloride | 7 | None | N.D. | N.D. |
| 51 | Potassium iodide | 7 | 58 | 56 | 0 |
| 52 | Potassium iodide | 7 | +113* | 7 | +3 |
| 53 | Sodium dithionite | 10 | 62 | 64 | 0 |
| 54 | Sodium formate | 10 | 80 | 84 | 0 |
| 55 | Sodium formate | 10 | 31 | 50 | 0 |
| 56 | Sodium formate | 10 | +72* | 69** | 0 |
| 57 | Sodium formate | 10 | +42* | 47* | +26 |
| 58 | Sodium formate | 10 | 16 | 20 | N.D. |
| 59 | Sodium thiosulfate | 10 | +378 | +230*** | 0 |
| 60 | Sucrose (corn syrup) | 10 | +39 | 2 | +9 |
| 61 | Thioglycolic acid | 7 | 63 | 69 | 0 |
| 62 | Urea | 7 | None | N.D. | N.D. |
| 63 | Urea hydrochloride | 15 | None | N.D. | N.D. |
| 64 | Dextrose | 10 | 70 | 76 | 0 |
| 65 | Formic acid | 10 | 46 | 46 | +5 |
| 66 | Formic acid | 10 | 73 | 80 | +92 |
| 67 | Formic acid | 10 | 67 | 60 | +5 |

N.D. = Not Determined.
*The + sign indicates a percent increase in the amount of scale formed.
**Due to operational problems, this result is questionable.
***Sulfate scale may have gathered iron silicate.

EXAMPLES 50 TO 67

Pilot unit field tests are conducted to test the reducing agents found useful in the autoclave tests of Examples 13 to 48 for effectiveness in geothermal brines from the field at Brawley, Calif., having pH values in the range from 4.9 to 5.5. The apparatus and method used are those described in Tests 1 to 4 above. Brines were used from three geothermal wells known as Veysey Nos. 7, 10, and 15. The concentrations of components in the field brines entering the unit typically fall within the following ranges of concentrations established for the three brines from Brawley, Calif. These ranges were established by compiling values for two representative Brawley brines, one containing the least and one containing the most dissolved salts found in the area: aluminum less than 0.3-2, antimony less than 5, arsenic 2.5-3.0, barium 880-1,320, boron 190-300, calcium 17,000-30,000, chloride 96,000-160,000, copper 1.7-5.2, iron 520-4,200, lead 55-260, magnesium 110-180, manganese 500-1,600, potassium 13,500-15,000, rubidium 43-72, silicon 200-275, silver less than 2.0, sodium 31,000-59,000, strontium 760-1,400, tin less than 10, zinc 302-1,020, and total dissolved solids 180,000-281,000. (All of the foregoing values are reported in parts per million by weight.)

In each of the tests, three times the stoichiometric amount of reducing agent required to reduce the trivalent iron and manganese cations contained in the fluid stream to divalent cations is injected into the flowing stream of brine upstream of the first separator and just ahead of the pressure-reducing level control valve.

In Table V is tabulated a summary of results from Tests 50 to 67, inclusive. The data illustrate the telling effectiveness of the reducing agent additives for decreasing formation of iron silicate scale. In particular, the use of formic acid reduced iron silicate scale by 46 to 80 percent, dextrose by 76 percent, thioglycolic acid by 69 percent, sodium formate by 20 to 84 percent, and

EXAMPLES 68 through 71

Tests to determine the effect upon the pH of the brine stream of adding a greater than stoichiometric amount of reducing agent are performed. The two most acidic reducing agents of those recommended for use in this invention are tested to determine what is the greatest change in pH that can be expected from using any of the reducing agents preferred herein. On a pure weight basis of acid, formic or thioglycolic acid in the concentrations shown in Table VI are stirred into each of four 1,000-millimeter beakers containing degassed atmospheric pond brine from Veysey #12 geothermal well at Brawley, Calif., containing about 30 ppmw of trivalent iron and 8 ppmw of trivalent manganese cations. The brine and acid solution is equilibrated at 77° F. The change in the pH of the brine is measured using a conventional pH meter. The results displayed in Table VI show that the change in pH caused by addition of the reducing agent is measured to be not more than 0.10 pH units for each acid at concentrations up to 7 times stoichiometric. It is therefore expected that addition of more than two times the stoichiometric amount of reducing agent will cause a decrease in the pH of the fluid stream of not more than 0.1 pH unit.

TABLE VI

CHANGE IN THE pH OF BRINE FLUID CAUSED BY USE OF ACIDIC REDUCING AGENTS

| Test No. | Concentration of Reducing Agent (ppmw) | Times Stoichiometric | Reducing Agent | Change in pH (pH units) |
|---|---|---|---|---|
| 68 | 70 | 4.8 | formic acid | 0.04 |
| 69 | 70 | 1.2 | thioglycolic acid | 0.04 |
| 70 | 102 | 7 | formic acid | 0.10 |
| 71 | 408 | 7 | thioglycolic acid | 0.10 |

EXAMPLES 72 TO 77

A field brine which has a pH of about 3.5 and contains between about 24 and 31 ppm by weight of ferric ions after degassing and prolonged exposure to air is used in autoclave tests to determine the effectiveness of reducing agents at low pH for reducing ferric to ferrous ions when employed in a concentration of 100 ppmw.

The concentration of total dissolved solids in the brine ranges from about 202,000 to 333,000 ppm by weight. The apparatus and method is the same as that described in Examples 13 to 48 above. The results of Tests 72 through 77 as summarized in Table VII show that sodium formaldehyde sulfoxylate, zinc dust, iron powder, and sodium formaldehyde bisulfite are effective reducing agents for reducing ferric ions at low pH under conditions of high temperature and pressure. Animal glue, the preferred thickening agent for suspending finely divided particulates, and glycine also prove effective for reducing ferric ions, although their effectiveness is not as great as that of the above-named reducing agents.

TABLE VII
AUTOCLAVE TESTS OF REDUCING AGENTS

| Test No. | Reducing Agent | Initial Conc. $Fe^{+3}$ (ppm) ** | Final Conc. $Fe^{+3}$ @ Room Temperature (ppm) | Final Conc. $Fe^{+3}$ @ 500° F. (ppm) | % Reduction in $Fe^{+3}$ @ 500° F. |
|---|---|---|---|---|---|
| 72 | Sodium formaldehyde sulfoxylate | 31 | 6 | 4 | 87 |
| 73 | zinc dust | 29 | 7 | 3.5 | 88 |
| 74 | Iron powder | 30 | — | 2.5* | 92 |
| 75 | Sodium formaldehyde bisulfite | 24 | — | 3 | 87 |
| 76 | Animal glue | 28 | — | 6 | 78 |
| 77 | Glycine | 30 | — | 6 | 78 |

*Conducted at 400° F.
**Weight parts per million weight parts.

EXAMPLES 78 through 85

Pilot unit field tests were conducted to compare the effect of using varying concentrations of sodium formate in the geothermal waters extracted from two wells at Brawley, Calif., Veysey 7 and Veysey 15. The apparatus and method used are those described in Tests 1 to 4 above. In Tests 76 to 79, the waters from Veysey 7, which contain 180,000 ppm by weight of total dissolved solids, were injected with sodium formate in concentrations ranging from zero to 120 ppm by weight representing from zero to 5.5 times the stoichiometric amount needed for reduction of the trivalent ions of iron (about 25 to 30 milligrams per liter) and manganese (less than 5 milligrams per liter) present in the brine. In Tests 82 through 85, the waters from Veysey 15, which contain 281,000 ppm by weight of total dissolved solids, were injected with from zero to 90 ppm by weight of sodium formate representing from zero to 2.9 times the stoichiometric amount needed for reduction of the trivalent ions of iron (about 41 to 43 ppm by weight) and manganese (about 5 to 6 ppm by weight) to divalent cations. Results of the tests are summarized in Table VIII.

TABLE VIII
RESULTS OF PILOT SCALE FIELD TESTS AT VARIOUS CONCENTRATIONS OF REDUCING AGENTS

| Test No. | Brine Source (Veysey Well #) | Concentration of Reducing Agent ppmw | Total Dissolved Solids ppmw | Multiples of Stoichiometric Amount | Scaling Rate Iron Silicate (g/hr.) | % Reduction of Iron Silicate |
|---|---|---|---|---|---|---|
| 78 | 7 | 0 | 180,000 | — | 25.3 | — |
| 79 | 7 | 60 | 180,000 | 2.8 | 12.7 | 50 |
| 80 | 7 | 60 | 180,000 | 2.8 | 10.5 | 59 |
| 81 | 7 | 120 | 180,000 | 5.5 | 4.5 | 82 |
| 82 | 15 | 0 | 281,000 | — | 46 | — |
| 83 | 15 | 0 | 281,000 | — | 50 | — |
| 84 | 15 | 60 | 281,000 | 1.9 | 41 | 15 |
| 85 | 15 | 90 | 281,000 | 2.9 | 35 | 27 |

The results of the tests show that the scaling rate in Veysey 15 is roughly twice that in Veysey 7 in the absence of reducing agent, an effect due at least in part to the higher concentrations of iron, manganese, and silica in the waters from Veysey 15. Also, comparison of the results of Tests 79, 80, and 85 shows that the percent reduction in scaling obtained by adding roughly 3 times the stoichiometric amount of reducing agent for trivalent iron and manganese cations present in the two wells was about twice as great in Veysey 7 as in Veysey 15. The greater effectiveness in Veysey 7 can be attributed to the substantially lower content of total dissolved solids in the geothermal fluids therein.

As used herein, parts per million by weight is equivalent to milligrams per liter in the measure of concentrations of species in brine.

While particular embodiments of the invention have been described, it will be understood that the invention is not limited thereto since many obvious modifications can be made It is intended to include within this invention any such modifications as will fall within the scope of the appended claims.

We claim:

1. A method for treating a geothermal fluid having a pH of 7 or below containing a dissolved trivalent transition-metal cation and a dissolved siliceous material which tend to interact to form insoluble trivalent silicates, said method comprising adding to said fluid a brine-soluble reducing agent comprising a sulfur-containing agent having a reduction potential capable of reducing said trivalent cation to a divalent cation.

2. The method of claim 1 wherein said geothermal fluid stream also contains silver and said precipitation also contains silver.

3. The method of claim 2 wherein the concentration of silver in said scale is greater than the concentration of said silver in said geothermal fluid stream.

4. A method for treating a geothermal fluid having a pH of 7 or below containing a dissolved trivalent transition-metal cation and a dissolved siliceous material which tend to interact to form insoluble trivalent silicates, said method comprising adding essentially in the absence of free oxygen sufficient brine-soluble reducing agent to said fluid which changes the pH of said fluid mixture by less than about 0.1 pH unit, said reducing agent comprising a sulfur-containing agent having a reduction potential capable of reducing said trivalent cation to a divalent cation.

5. The method of claim 4 wherein said sulfur-containing reducing agent has a reduction potential insufficient to further reduce said divalent cation.

6. The method of claim 4 wherein said sulfur-containing reducing agent has a reduction potential insufficient to reduce a hydrogen cation.

7. A method for treating a geothermal fluid having a pH of 7 or less containing a plurality of dissolved solids which include one or more dissolved transition-metal cations and a dissolved siliceous material which tend to interact to form at least one insoluble metal silicate, said method comprising adding to said fluid a brine-soluble reducing agent comprising a sulfur-containing agent having a reduction potential capable of reducing said metal cation in the presence of said plurality of dissolved solids.

8. The method of claim 7 wherein said metal cation comprises iron.

9. The method of claim 8 wherein said iron cation comprises a trivalent iron cation.

10. The method of claim 9 wherein said metal cation also comprises a trivalent manganese cation.

11. The method of claim 10 wherein the pH of said geothermal fluid before said adding step and the pH of said fluid after said adding step differ by no more than 0.1 units.

12. The method of claim 11 wherein said geothermal fluid is under a pressure above one atmosphere and which also comprises the step of first pressure lowering of the geothermal fluid after said reducing agent adding step.

13. The method of claim 12 wherein said first pressure lowering step lowers the pressure to below the saturated vapor pressure of said geothermal fluid.

14. The method of claim 13 wherein said first pressure lowering step flashes a vapor portion from a liquid portion of said geothermal fluid and separates a majority of said vapor portion from said liquid portion.

15. The method of claim 14 which also comprises the step of a second pressure lowering after said first pressure lowering step, wherein said liquid portion is subjected to a second lowering in pressure, flashing an additional vapor portion and further separating a majority of said additional vapor portion.

16. The method of claim 15 wherein said method is accomplished within a geothermal fluid handling system which comprises flash vessels, piping, and pressure control devices, wherein said method also comprises the step of injecting a majority of said liquid portion passing through said geothermal fluid handling system after said second pressure lowering step.

17. The method of claim 16 wherein said reducing agent reduces said trivalent metal cations to divalent cations.

18. The method of claim 17 wherein said reducing agent is selected from the group consisting of sulfur, carbon disulfide, sulfur monochloride, sulfur dichloride, thioglycolic acid, alkali salts of thioglycolic acid, ammonium thioglycolate, ammonium thiocarbonate, thiourea, sodium formaldehyde bisulfite, sodium thiosulfate, ammonium thiosulfate, sodium bisulfite, and sodium sulfite.

19. The method of claim 18 wherein said insoluble silicate tends to deposit as a constituent of scale within said geothermal fluid handling system and wherein said method inhibits but does not eliminate the formation of said scale.

20. The method of claim 19 wherein said method prevents the formation of between about 70 and about 90 percent of said one or more insoluble silicates deposited as said scale.

21. The method of claim 20 wherein said geothermal fluid also comprises dissolved silver.

22. The method of claim 21 wherein said scale also comprises silver.

23. The method of claim 22 wherein said silver scale concentration is increased after said adding step.

24. The method of claim 23 wherein said method also lowers corrosion of at least a portion of said geothermal fluid handling system.

25. The method of claim 24 wherein said geothermal fluid handling system is composed at least in part of a metal alloy being selected from the group consisting of 1018, P9, P11, A 515, and K55 and combinations thereof.

26. The method of claim 25 wherein said sulfur-containing reducing agent has a reduction potential insufficient to reduce a hydrogen cation.

27. The method of claim 26 wherein said trivalent metal cations are reduced only to divalent metal cations.

28. The method of claim 27 wherein said adding step is accomplished essentially in the absence of free oxygen.

29. A method for treating a geothermal fluid having a pH of 7 or less which comprises dissolved silver, and dissolved ferric cation and dissolved siliceous material which tend to interact to form an insoluble ferric silicate, said method comprising adding to said fluid a sulfur-containing agent soluble in said fluid and having a reduction potential capable of reducing said ferric cation.

30. The method of claim 29 wherein said geothermal fluid is under a pressure above one atmosphere and which also comprises the step of first pressure lowering of the geothermal fluid after said reducing agent adding step.

31. The method of claim 30 wherein said first pressure lowering step lowers the pressure to below the saturated vapor pressure of said geothermal fluid.

32. The method of claim 31 wherein said first pressure lowering step flashes a vapor portion from a liquid portion of said geothermal fluid and separates a majority of said vapor portion from said liquid portion.

33. The method of claim 32 which also comprises the step of a second pressure lowering after said first pressure lowering step, wherein said liquid portion is subjected to a second lowering in pressure, flashing an additional vapor portion and further separating a majority of said additional vapor portion.

34. The method of claim 33 wherein said method is accomplished within a geothermal fluid handling system which comprises flash vessels, piping, and pressure control devices, wherein said method also comprises the step of injecting a majority of said liquid portion passing through said geothermal fluid handling system after said second pressure lowering step.

35. The method of claim 34 wherein the pH of said geothermal fluid before said adding step and the pH of said fluid after said adding step differ by no more than 0.1 units.

36. The method of claim 35 wherein said insoluble silicate tends to deposit as a constituent of scale within said geothermal fluid handling system and wherein said method inhibits but does not eliminate the formation of said scale.

37. The method of claim 36 wherein said method prevents the formation of between the 70 and about 90 percent of said insoluble silicate deposited as said scale.

38. The method of claim 37 wherein said geothermal fluid also comprises dissolved silver.

39. The method of claim 38 wherein said scale after said adding step also comprises silver.

40. The method of claim 39 wherein the silver concentration in said scale after said adding step is more than the silver concentration before said adding step.

41. The method of claim 40 wherein said sulfur-containing reducing agent has a reduction potential insufficient to reduce a hydrogen cation.

42. The method of claim 41 wherein said reducing agent is selected from the group consisting of sulfur, carbon disulfide, sulfur monochloride, sulfur dichloride, thioglycolic acid, alkali salts of thioglycolic acid, ammonium thioglycolate, ammonium thiocarbonate, thiourea, sodium formaldehyde bisulfite, sodium thiosulfate, ammonium thiosulfate, sodium bisulfite, and sodium sulfite.

43. The method of claim 42 wherein said method also lowers corrosion of at least a portion of said geothermal fluid handling system.

44. The method of claim 43 wherein said geothermal fluid handling system is composed at least in part of a metal alloy being selected from the group consisting of 1018, P5, P9, P11, A 515, and K55 and combinations thereof.

45. The method of claim 44 wherein said adding step is accomplished essentially in the absence of free oxygen.

46. A method for treating an aqueous geothermal fluid having a pH at or below about 7 and containing dissolved ferric cations and siliceous material which tend to interact to form insoluble, iron-rich silicates, said method comprising adding to said fluid a reducing agent effective for substantially lowering the concentration of said dissolved ferric cations so as to substantially reduce the formation of said insoluble silicates which would other wise form in the absence of adding the reducing agent while changing the pH of the geothermal fluid by less than about 0.1 pH unit, said reducing agent selected from the group consisting of sulfur, carbon disulfide, sulfur monochloride, sulfur dichloride, sodium dithionite, thioglycolic acid, alkali salts of thioglycolic acid, ammonium thioglycolate, ammonium thiocarbonate, thiourea, sodium formaldehyde sulfoxylate, sodium formaldehyde bisulfite, sodium thiosulfate, ammonium thiosulfate, sodium bisulfite and sodium sulfite.

47. The method of claim 46 wherein the geothermal fluid contains trivalent iron and trivalent manganese cations and said method includes adding the reducing agent to said steam in an amount between about 2 and about 7 times stoichiometric for reducing said trivalent iron and trivalent manganese cations to divalent cations.

48. The method of claim 47 wherein the amount of reducing agent added is about 3 to about 5 times the stoichiometric amount for reducing the trivalent iron and trivalent manganese cations.

49. The method of claim 46 wherein the concentration of iron in the geothermal fluid is at least about 500 ppm by weight and the concentration of silicon in the geothermal fluid is at least about 150 ppm by weight.

50. The method of claim 46 wherein the reducing agent comprises sodium formaldehyde sulfoxylate.

51. A method for inhibiting precipitation of insoluble iron- and manganese-rich silicates upon internal surfaces of liquid-handling equipment from a flow of pressurized, hot, predominantly aqueous geothermal flow stream having a pH at or below about 7 and which contains trivalent iron and trivalent manganese cations and also contains siliceous material which tend to interact to form said insoluble silicates, said method comprising:
(A) adding to the geothermal fluid between about 2 and 7 times the stoichiometric amount of a reducing agent effective at fluid conditions for reducing said trivalent iron and trivalent manganese cations only to divalent cations, and preventing the formation of between about 70 and about 90 percent of said insoluble silicates, while changing the pH of said fluid by less than about 0.1 pH unit, said reducing agent being selected from the group consisting of sulfur, carbon disulfide, sulfur monochloride, sulfur dichloride, thioglycolic acid, alkali salts of thioglycolic acid, ammonium thioglycolate, ammonium thiocarbonate, thiourea, sodium formaldehyde bisulfite, sodium thiosulfate, ammonium thiosulfate, sodium bisulfite, and sodium sulfite, and
(B) subjecting said fluid to a sudden change in conditions so that at least a portion of the fluid is flashed to produce steam.

52. The method of claim 51 wherein the geothermal fluid has a concentration of total dissolved solids of at least about 180,000 ppm by weight.

53. A method for treating an aqueous flow of hot, pressurized geothermal fluid having a pH of no more than about 7 and containing trivalent iron and trivalent manganese cations and siliceous material which tend to interact to form insoluble, iron- and manganese-rich silicates, said method comprising:
(A) introducing into said fluid flow an additive consisting essentially of a reducing agent in an amount effective to reduce the trivalent iron and trivalent manganese cations to divalent cations so as to reduce the formation of said insoluble silicates which would otherwise form in the absence of adding the reducing agent while changing the pH of the geothermal fluid by less than about 0.1 pH unit, said reducing agent being selected from the group consisting of sulfur, carbon disulfide, sulfur monochloride, sulfur dichloride, sodium dithionite, thioglycolic acid, alkali salts of thioglycolic acid, ammonium thioglycolate, ammonium thiocarbonate, thiourea, sodium formaldehyde sulfoxylate, sodium formaldehyde bisulfite, sodium thiosulfate, ammonium thiosulfate, sodium bisulfite and sodium sulfite; and (B) subjecting said fluid flow to a sudden pressure reduction so as to cause a portion of the fluid to flash into steam.

54. The method of claim 53 wherein the amount of reducing agent introduced into the fluid flow is between about 2 and 7 times the stoichiometric amount needed to reduce the trivalent iron and trivalent manganese cations to divalent cations.

55. A method for inhibiting the precipitation of iron and silica scales from a hot, predominantly aqueous geothermal fluid stream containing trivalent iron and trivalent manganese cations and a siliceous material which tend to interact to form insoluble, iron-rich silicates, said method comprising introducing into said stream an additive consisting essentially of a reducing agent in an amount greater than stoichiometric effective for reducing said trivalent iron and trivalent manganese cations to divalent cations, but less than that which will change the pH of the fluid stream by about 0.1 pH unit, said reducing agent being selected from the group consisting of sulfur, carbon disulfide, sulfur monochloride, sulfur dichloride, sodium dithionite, thioglycolic acid, alkali salts of thioglycolic acid, ammonium thioglycolate, ammonium thiocarbonate, thiourea, sodium formaldehyde sulfoxylate, sodium formaldehyde bisulfite, sodium thiosulfate, ammonium thiosulfate, sodium bisulfite and sodium sulfite.

56. The method of claim 55 wherein the amount of reducing agent added is between about 2 to about 7 times the stoichiometric amount for transforming trivalent iron and manganese trivalent cations to divalent cations.

57. The method of claim 55 wherein the reducing agent comprises sodium formaldehyde sulfoxylate.

58. The method of claim 55 wherein the pH of the fluid stream is below about 7 and the reducing agent comprises sodium formaldehyde sulfoxylate.

59. The method of claim 58 wherein the silicious material is silicon having a concentration of at least about 150 parts per million by weight.

60. The method of claim 46 wherein the reducing agent is added in an amount at least slightly greater than the stoichiometric amount for reducing the trivalent iron and trivalent manganese cations to divalent cations.

61. The method of claim 60 wherein the concentration of the iron is at least about 500 parts per million by weight.

62. The method of claim 60 wherein the silica scale-forming species is silicon at a concentration of at least about 150 parts per million by weight and the concentration of the iron is at least about 500 parts per million by weight.

63. The method of claim 46 wherein the geothermal fluid further contains at least about 10,000 parts per million by weight dissolved potassium calculated as K.

64. The method of claim 46 wherein the geothermal fluid further contains at least about 90,000 part per million by weight of dissolved chloride.

65. The method of claim 47 wherein at least about 95 percent of the cations present in said geothermal fluid are the cations of iron and manganese.

66. The method of claim 47 wherein at least about 99 percent of the cations present in said geothermal fluid are the cations of iron and manganese.

67. The method of claim 46 wherein the formation of said iron-rich silicates is reduced by at least about 50 percent.

68. The method of claim 46 wherein the reducing agent comprises sulfur.

69. The method of claim 46 wherein the reducing agent comprises carbon disulfide.

70. The method of claim 46 wherein the reducing agent comprises sulfur monochloride.

71. The method of claim 46 wherein the reducing agent comprises sulfur dichloride.

72. The method of claim 46 wherein the reducing agent comprises sodium dithionite.

73. The method of claim 46 wherein the reducing agent comprises thioglycolic acid.

74. The method of claim 46 wherein the reducing agent comprises one or more alkali salts of thioglycolic acid.

75. The method of claim 46 wherein the reducing agent comprises ammonium thioglycolate.

76. The method of claim 46 wherein the reducing agent comprises ammonium thiocarbonate.

77. The method of claim 46 wherein the reducing agent comprises thiourea.

78. The method of claim 46 wherein the reducing agent comprises sodium thiosulfate.

79. The method of claim 46 wherein the reducing agent comprises ammonium thiosulfate.

80. The method of claim 46 wherein the reducing agent comprises sodium bisulfite.

81. The method of claim 46 wherein the reducing agent comprises sodium sulfite.

* * * * *